(12) United States Patent  
Cha et al.

(10) Patent No.: US 8,499,161 B2
(45) Date of Patent: Jul. 30, 2013

(54) METHOD AND APPARATUS FOR SECURE TRUSTED TIME TECHNIQUES

(75) Inventors: Inhyok Cha, Yardley, PA (US);
Yogendra C. Shah, Exton, PA (US);
Andreas U. Schmidt, Frankfurt am Main (DE); Christian Hett, Niddatal (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1167 days.

(21) Appl. No.: 12/389,088

(22) Filed: Feb. 19, 2009

(65) Prior Publication Data

US 2010/0011214 A1    Jan. 14, 2010

Related U.S. Application Data

(60) Provisional application No. 61/029,669, filed on Feb. 19, 2008.

(51) Int. Cl.
*H04L 29/06* (2006.01)
(52) U.S. Cl.
USPC ............................................. 713/178; 726/26
(58) Field of Classification Search
USPC ................................. 702/187; 713/178; 726/26
See application file for complete search history.

(56) References Cited

U.S. PATENT DOCUMENTS

| 5,189,700 A | 2/1993 | Blandford |
| 2006/0053294 A1* | 3/2006 | Akenine ........................ 713/178 |
| 2006/0074600 A1 | 4/2006 | Sastry et al. |
| 2007/0121523 A1* | 5/2007 | Morandin ...................... 370/252 |
| 2007/0266256 A1 | 11/2007 | Shah et al. |
| 2008/0143723 A1* | 6/2008 | Zhou ............................. 345/440 |

FOREIGN PATENT DOCUMENTS

| JP | 2004-264992 | 9/2004 |
| WO | WO 2007/149154 | 12/2007 |

OTHER PUBLICATIONS

Marzullo's Algorthm, retrieved from, http//en.wikipedia.prg/wiki/Marzullo's_algorthm, Maintaining the Time in A Distributed System: An Example of a Loosely-Coupled Distributed Service, PhD. Dissertation, Stanford University, Department of Electrical Engineering, Feb. 1984, (last modified Apr. 18, 2008, retrieved Mar. 31, 2009).

Open Mobil Alliance, "DRM Architecture", Draft Version 2.0, OMA-DRM-ARCH-V2_0-20040820-C, (Aug. 20, 2004).

Russel, "Analysis of a Secure Time Stamp Device", GSEC Practical Assignment Version 1.2f for GIAC Certification in Secure Essentials, (Oct. 17, 2001).

(Continued)

*Primary Examiner* — Hadi Armouche
(74) *Attorney, Agent, or Firm* — Woodcock Washburn LLP

(57) ABSTRACT

A method and apparatus to establish a trustworthy local time based on trusted computing methods are described. The concepts are scaling because they may be graded by the frequency and accuracy with which a reliable external time source is available for correction and/or reset, and how trustworthy this external source is in a commercial scenario. The techniques also take into account that the number of different paths and number of hops between the device and the trusted external time source may vary. A local clock related value which is protected by a TPM securely bound to an external clock. A system of Accuracy Statements (AS) is added to introduce time references to the audit data provided by other maybe cheaper sources than the time source providing the initial time.

14 Claims, 9 Drawing Sheets

OTHER PUBLICATIONS

Schmidt, "Trusted Computing: Introduction & Applications, Lecture 7: Trust in Identity Management Systems", Fraunhofer Institute for Secure Information Technology SIT, (Darmstadt, Germany, Summer Term 2007).

Schmidt, "Trusted Computing: Introduction & Applications, Lecture 5: Remote Attestation, Direct Anonymous Attestation", Fraunhofer Institute for Secure Information Technology SIT, (Darmstadt, Germany, Summer Term 2007).

Trusted Computing Group, "TCG Mobil Reference Architecture", Specification Version 1.0, Revision 1, (Jun. 12, 2007).

Trusted Computing Group, "TPM Main Part 1 Design Principles", Specification Version 1.2, Level 2 Revision 103, (Jul. 9, 2007).

Trusted Computing Group, "TPM Main Part 2 TPM Structures", Specification Version 1.2, Level 2 Revision 103, (Oct. 26, 2006).

Trusted Computing Group, "TPM Main Part 3 Commands", Specification Version 1.2, Level 2 Revision 103, (Oct. 26, 2006).

Balfe et al., "Trusted Computing: Providing Security for Peer-to-Peer Networks," IEEE International Conference on Peer-to-Peer Computing, pp. 117-124 (Aug. 2005).

Cooper et al., "Towards an Open, Trusted Digital Rights Management Platform," Proceedings of the ACM Workshop on Digital Rights Management, pp. 79-88 (2006).

Marzullo's Algorthm, retrieved from, http://en.wikipedia.prg/wiki/Marzullo's_algorthm, Maintaining the Time in A Distributed System: An Example of a Loosely-Coupled Distributed Service, PhD. Dissertation, Stanford University, Department of Electrical Engineering, Feb. 1984, (last modified Apr. 18, 2008, retrieved Mar. 31, 2009).

Schellekens et al., "Remote Attestation on Legacy Operating Systems with Trusted Platform Modules," First International Workshop on Run Time Enforcement for Mobile Distributed Systems (Sep. 2007).

Seshadri et al., "Pioneer: Verifying Code Integrity and Enforcing Untampered Code Execution on Legacy Systems," Association for Computing Machinery Operating Systems Review, vol. 39, No. 5 (2005).

Marzullo's Algorthm, retrieved, http://en.wikipedia.prg/wiki/Marzullo's_algorthm, Maintaining the Time in A Distributed System: An Example of a Loosely-Coupled Distributed Service, PhD. Dissertation, Stanford University, Department of Electrical Engineering, Feb. 1984, (last modified Apr. 18, 2008, retrieved Mar. 31, 2009).

* cited by examiner

METHOD AND APPARATUS FOR SECURE TRUSTED TIME TECHNIQUES

CROSS REFERENCE TO RELATED APPLICATIONS

This application claims the benefit of U.S. Provisional Application No. 61/029,669 filed on Feb. 19, 2008, which is incorporated by reference as if fully set forth.

TECHNOLOGY FIELD

The method and apparatus are related to wireless communications.

BACKGROUND

A reliable local time is required to record the actual time for certain events in various business cases. For example, if certain consumption data in an "off-line"-scenario are recorded, a trustworthy internal clock is required to secure the date of the consumption. Application areas span from applications in the energy production (e.g. distributed plants), synchronization software, and up to digital rights management (DRM) use cases. The common denominator is that an external time authority is not always available due to physical or economical externalities.

Trusted Computing (TC) provides a means in the Trusted Platform Module (TPM) to communicate time related counter values to other parties and to protect them inside a trusted platform. However, it would be useful to extend these limited capabilities to enable secure timing and provide accuracy statements.

In view of the goal to obtain trusted time statements using the capabilities of trusted platforms, where the statements allow an external verifier to trust that the tick counter values of a platform at some earlier time correspond to certain real time values with defined, provable accuracy, the TCG specifications have a number of shortcomings.

First, there is no association to the trust in the specific platform P. That is, a tick stamp alone does not indicate from which platform in which state it was generated. It does not even indicate whether the platform was a trusted one with a hardware TPM in it. The data structures of tick stamps could be forged by anyone, in particular using software emulations of TPMs. Accordingly, it would be desirable to have trustworthy tick stamping methods.

Second, the TIR is a factory value pre-installed with a TPM instance which might or might not be very accurate, and will perhaps loose accuracy over the lifetime of a TPM. Since the TIR is crucial to calculate real time values from TCVs, trustworthy methods to assess the real TIR at any time would be desirable.

Third, the accuracy statement defined by the TCG specifications fixes just one point in time in relation to TCVs. Improvements of accuracy, i.e., tighter limits on the relations of constant-TCV intervals to real time clock values, while maintaining trustworthiness of assertions would be desirable.

Fourth, time synchronisation in distributed systems may involve many time sources in order to gain accuracy. An extension of trusted time statements to include those methods would be desirable.

Finally, the usefulness of TCVs is severely limited because they must be reset at unpredictable events according to the TPM specification. Though an active tick counter session is made unique by the TSN, it would be desirable to bridge the association of TCVs to RTC values between tick counter sessions. Real use cases for TCVs, e.g. in the context of Digital Rights Management (DRM) would also be desirable.

SUMMARY

A method and apparatus are used to protect time values in wireless communications. The apparatus is equipped with a TPM that performs an exchange of messages with a time authority (TA) to align a tick stamp from a tick counter of the TPM of the apparatus with a real time clock value provided by the TA. The apparatus transmits a time stamp request and receives a time stamp in response to the request. The apparatus generates and transmits a tick stamp, and receives an alternate accuracy statement in response.

In a second embodiment, the apparatus receives a time stamp and generates two successive tick stamps for transmission. In this embodiment, the apparatus receives a modified time stamp in response to the transmission of the two tick stamps. Upon receipt of the modified time stamp, the apparatus tick stamps the modified time stamp.

In a third embodiment, an accuracy statement may be protected by generating a certified signing key (CSK) from an attestation identity key (AIK). In this embodiment, an accuracy statement and a trusted time statement (TTS) are generated. The AIK credential, a portion of the CSK, the accuracy statement, or signed data may be revealed.

BRIEF DESCRIPTION OF THE DRAWINGS

A more detailed understanding may be had from the following description, given by way of example in conjunction with the accompanying drawings wherein.

DETAILED DESCRIPTION

Figure 1:
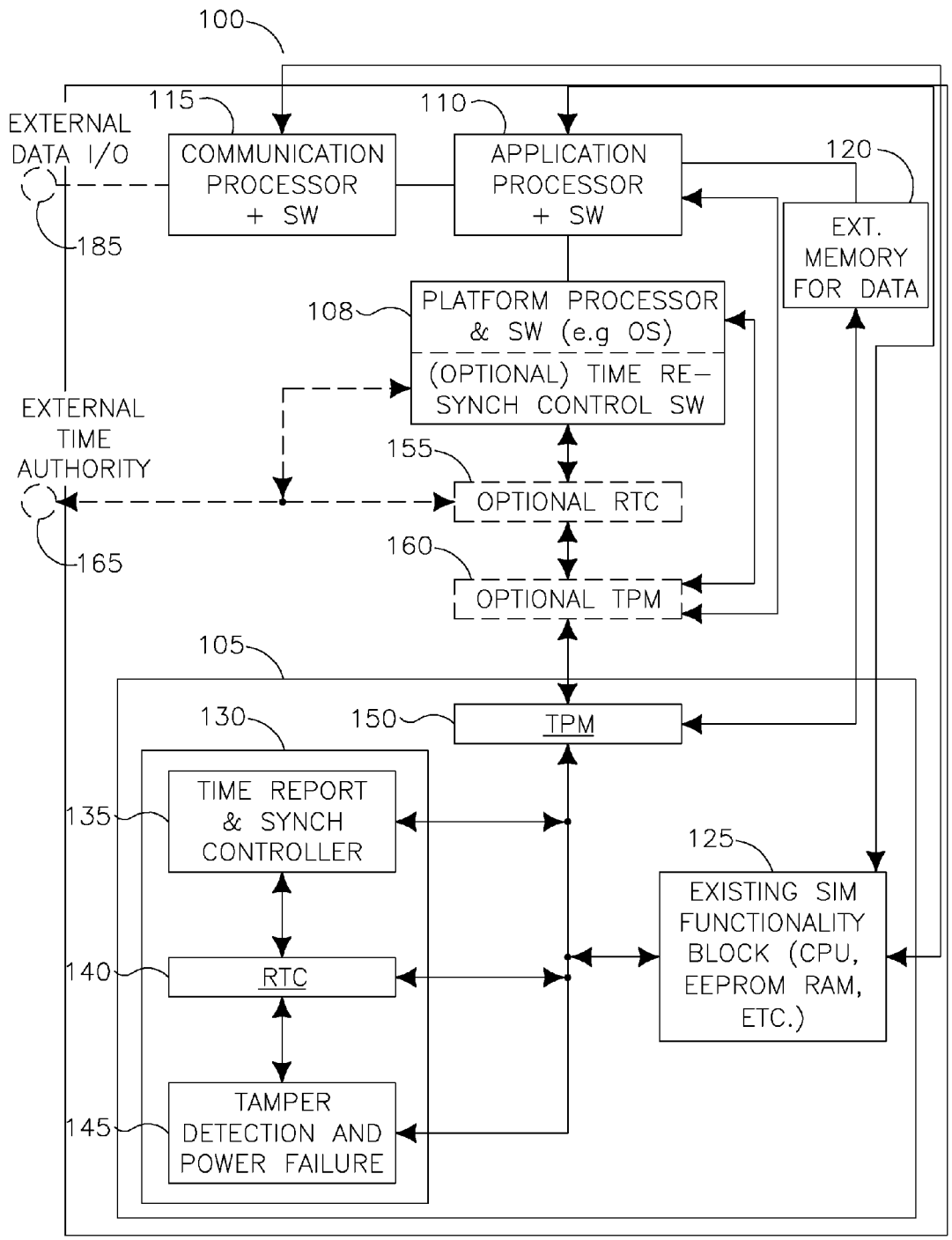
FIG. 1 is a diagram of an example wireless transmit/receive unit (WTRU) configured to establish a trustworthy local time.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "SIM" includes a SIM ICC, a USIM, Universal Integrated Circuit Card (UICC), Removable User Identity Module (RUIM), or any other removable media containing WTRU identity information. The TPM, or its mobile variant MTM, are interchangeably referred to hereafter for simplicity.

By definition, a tick stamp is a time statement produced by the TPM, whereas a time stamp is a time statement produced by an external time authority (TA). The TAs may be used to guarantee a certain accuracy of their time statements. The tick stamp may be a known unit of time count relative to the time when the tick counter was reset, whereas a time stamp is an actual real-time value.

The TPM, or its mobile variant the Mobile Trusted Module (MTM), offers a securely protected, read-only Tick Counter Value (TCV) which is initialized with zero at specific events, such as the start of a new boot cycle of the TPM-equipped device. This TCV remains valid as long as possible. If a new TCV is required because the old one was lost (e.g. because of power failure) or due to a new contract with a service provider necessitating a new TCV start point, a new unique Tick Session Nonce (TSN)-value is generated by the TPM's random number generator. This period of time during which a constant TSN-value is used in communication with external entities is called a tick session. The tick session provides the unique security context for the time statements issued by the device. The assumption underlying the TCG's design is that at least one external connection to another secure time scale is provided for each tick session. This would be sufficient to meet the requirement to have the TPM apply as many time stamps as needed, provided that the Tick Counter is sufficiently accurate.

The entire time functionality of the secure time function provided by the TCG standards relies on the following functional building blocks, data structures and commands. Timing Ticks subsume the mandatory capability of a TPM on an arbitrary platform to maintain and increment Tick Counter Values (TCV) with a pre-defined, Tick Increment Rate (TIR, in milliseconds). The specification makes no requirement on the mechanism required to implement the tick counter in the TPM, or on the ability for the TPM to increment the tick counter across power cycles or in different power modes on a platform. However, the TCV must be set to 0 at the start of each tick session. The TPM must start a new tick session if the TPM loses the ability to increment the TCV according to the TIR. When this happens, the tick session is determined according to implementation and is platform-specific. In particular, the tick sessions are not necessarily identical to TPM initialization cycles.

It should be noted that the TCG specification requires an explicit process if the TPM discovers tampering with the tick count. In this case the TPM must treat this as an attack and shut down further TPM processing as if a self-test had failed.

The TSN is generated by the TPMs internal random number generator at the beginning of each new tick session and is forced to all zeroes at the end of each tick session.

CURRENT_TICKS TPM structure has the characteristic feature that it contains TCV, TSN, and TIR in one structure. Only this structure is used in all TPM commands operating with the Timing Tick's functionality. This guarantees that the identity of the tick session is maintained in all such operations. Furthermore, it allows association to real times by multiplying TCV (differences) with TIR, and is the basis for assessments of accuracy (e.g. drift). By definition of TPM structures, CURRENT_TICKS is secure against manipulation. However it is the responsibility of the CURRENT_TICKS data structure to maintain these associations—to tick session and TIR—when the data is used outside the TPM.

TPM_GetTicks command returns the CURRENT_TICKS structure as a data structure. Note that this command is public and requires no authorization.

TPM_TickStampBlob command is used to produce tick stamps over data blobs. It is a signing operation that requires authorization for its execution, for example, by invoking it in the authorization session in which the signing key to be used was loaded. The data that is actually signed depends on the signature scheme contained in the key handle input parameter to the command.

The operation then produces a digital signature over the following data (with shorthand for further use in brackets). In a certain "fixed" data field, the signed information, embodied by a TPM_SIGN_INFO data structure, an ASCII string "TSTP" is inserted, signifying that this signature is a tick stamp. A [D(blob)] is a hash value (digestToStamp of type TPM_DIGEST) of the blob to be tick stamped. It is the responsibility of the caller to generate this digest. An external nonce (Ne) is an externally provided 20-Byte value that is used to prevent replay attacks. The caller may insert an arbitrary value for this. The data in CURRENT_TICKS, i.e., TCV, TSN, and TIR may also be used.

In the following, the notation TS[Key](D(blob),Ne,TCV, TSN,TIR) is used—sometimes in abbreviated variants such as TS(D,TCV), TS[Key](TCV,TSN), etc., where no confusion can arise and some parameters play no role in the line of argument. Where multiple instances of entities are used, subscript notation such as $TCV\_1$, $TSN\_a$, $D(blob)\_1$ or $D\_1$, and $TS\_1, \ldots, TS\_n$, etc. is employed. Real physical times are denoted as $t\_1, \ldots, t\_n$. The value of the tick counter at some real time is written as $TCV(t)$.

In the following, the temporal inaccuracy associated with the mere invocation and execution of the TPM_TickStampBlob and TPM_GetTicks command is neglected. That is, when either command is invoked at real time t, it returns $TS(TCV(t))$, respectively, $TCV(t)$. Note that this is only true with certain probability, depending on the ratio of the TIR to TCV fetching delay, i.e., the latency with which the command is able to retrieve the current TCV. This means that the internal association of TCVs and real times on a platform is piecewise one-to-one, and may be represented as $T(TCV)$ for the time span during which TCV has a constant value:

$$T(TCV):=[t:TCV(t)=TCV], \text{ with } |T(TCV)|=TIR. \quad \text{Equation 1}$$

Intervals of constant TCV are disjointed for different values of TCV and $T(TCV\_1)<=T(TCV\_2)$ may be set if, and only if, $TCV\_1<=TCV\_2$, which induces a full ordering on the set of intervals of constant TCV. Statements that relate real times to intervals of constant TCV are defined by $T(TCV)<=t$ if and only if $s<=t$ for some s in $T(TCV)$. That is, $T(TCV)<=t$ means t lies to the right of, or inside, the interval $T(TCV)$.

The TCG specification provides, in an informative comment which is not normative, one single method for the association of TCVs with real times. It invokes an external time authority (TA) which is able to perform time stamping of arbitrary data, denoted TStamp(data,t). The specification provides the following. First, the platform P generates $TS(TCV(t\_1))$, at time $t\_1$, over some arbitrary known data. This tick stamp is sent immediately to TA. Second, the TA generates the time stamp $TStamp(TS(TCV(t\_1)),t\_a)$, at time $t\_a$, and sends it back to P. P then receives the time stamp from TA and immediately generates $AS(TCV(T\_1),t\_a,TCV(t\_2)):=TS(TStamp(TS(TCV(t\_1)),t\_a),TCV(t\_2))$. This is a signed assertion which may be used to prove to an external verifier the following time-bounding relation:

$$T\_1<=t\_a<=T\_2, \text{ where } T\_\frac{1}{2}:=T(TCV(t\_\frac{1}{2})) \quad \text{Equation 2}$$

In this example, the notation AS(t_a) is introduced to designate an accuracy statement for time t_a. It may be stored on the device and distributed to any place where it is needed, such as to the party who tests the timestamps or to other platforms. The difference between T_1 and T_2 equals the round trip time from the platform to TA and may be used to estimate the maximum time difference of the actual TCV to a later real time. This difference is not larger than:

$$d(T\_1, T\_2) := \{\sup |t\_1 - t\_2|; \text{ where } t\_\frac{1}{2} \text{ is in } T\_\frac{1}{2}\} \quad \text{Equation 3}$$

In combination with the platform certificate for the TPM, and all other certificates (including the one from TA), the device may demonstrate that its time stems from a trusted source and what is the maximum difference to the actual time based on the AS and the platform inherent drift of the clock. A platform may make trustworthy assertions about Real Time Clock (RTC) values and their relations to certain T(TCV) using tick stamps, time stamps from a TA, and other methods of Trusted Computing. These assertions are called trusted time statements (TTS).

FIG. 1 is an example diagram of a WTRU 100 configured to establish a trustworthy local time. The WTRU 100 includes an expanded SIM ICC 105, a platform processor 108, an application processor and SW 110, a communication processor 115, and external memory for data 120. The application processor 110 may include a digital rights management (DRM) agent (not shown).

The expanded SIM ICC 105 includes a SIM functionality block 125 configured for performing the generally known functions of a generic SIM ICC. Additionally, the expanded SIM ICC 105 includes a secure time component (STC) 130. The STC 130 includes a time report and synch controller 135, an RTC 140, and a tamper detection and power failure unit 145. Also included on the expanded SIM ICC 105 is a TPM unit 150.

The existing SIM functionality block 125 located on the expanded SIM ICC 105 is configured to hold the master secrets used to identify the phone and to provide authentication services for supporting the establishment of a secure channel between the WTRU and the network. The root identity is held securely within the device and never divulged outside of the secure or trusted domain of the SIM. The existing SIM block 125 also performs functions and algorithms needed for 3GPP Authentication and Key Agreement (AKA) related procedures.

The time report and synch controller 135, the RTC 140, and the tamper detection and power failure unit 145 make up the STC 130 located on the expanded SIM ICC 105. The STC 130 is configured to provide a secure record of the time of certain events, or data entries, in the form of a time certificate or signatures of time related data, as outputs to a requesting entity.

The time report and synch controller 135 is configured to control the functions of the RTC 140 and the tamper detection and power failure unit 145. Additionally, the time report and synch controller 135 may be linked to the existing SIM functionality block 125, the external time authority 165 and the platform processor 108. When time report and synch controller 135 is linked to the existing SIM functionality block 125, the SIM block 125 will be able to utilize secure measurements of time in its databases such as those for phone books.

The RTC 140 may include a quartz crystal oscillator. However, one of skill in the art would recognize that other accurate time keeping devices may be used in the RTC 140. The expanded SIM ICC 105 may be configured such that physically removing the RTC crystal would render the expanded SIM ICC 105 inoperable. This feature may also be incorporated in the tamper detection and power failure unit 145.

The tamper detection and power failure unit 145 is configured to provide a means of maintaining the secure nature of the STC 130 in the event of a power failure. The unit may include a power connection to provide power to the TPM and RTC. The unit 145 may also include tamper detection circuitry to trigger an alarm if tampering is detected. The tamper detection portion of the unit may also include tamper prevention features for preventing hardware and software level tampering. The power failure portion of the unit 145 may also include a capacitor or other short-term energy holding component, configured to hold enough energy to enable retention for a period of time long enough for saving of the RTC contents to a non-volatile memory in the event of a power failure or the expanded SIM may have its own dedicated and mechanically secured to be irremovable, backup battery.

The TPM 150 is also located on the expanded SIM ICC 105 and is linked to both the existing SIM functionality block 125 and the STC 130. By placing both the TPM 150 and the STC 130 on the expanded SIM ICC 105, the SIM ICC 105 is configured to protect and provide core root of trust for the time information produced by the STC 130, and to provide trust measurement capability. The presence of a TPM 150 may also ensure that the time records produced by the RTC 140 and associated time reporting and re-synch controller 135 are stored in protected memory. The protected memory may be located either inside the non-volatile memory in the TPM itself, or in memory external to the TPM but protected with encryption by TPM. Such protection of the time records will also be applicable to the case of a power failure. When the power failure unit 145 alerts the TPM 150 of the power failure, the TPM 150 retrieves the last storable time record from time report and re-synch controller 135 before the energy-holding device inside the power failure unit 145 runs out of power.

Several features are possible with the configuration of the present invention. For example, the expanded SIM ICC 105 of the present invention may provide a measure of the current time to an external requesting application either directly, or through the authentication procedure. This current time is useful in authenticating a device to an external network or for an external network to securely provide the current time, for synchronization.

The expanded SIM ICC 105 may also cryptographically secure and bind time information to a device with a digital signature. Alternatively, the expanded SIM ICC 105 may secure and bind time information through encryption where an encryption key is used to bind the information to a device. The storage of secure time information controlled by the expanded SIM ICC 105 may be inside the expanded SIM ICC 105, or outside of the SIM ICC 105, but inside the phone's external memory 120, or both.

The expanded SIM ICC 105 may be used to provide mechanisms to enhance existing applications performed by the SIM functionality block 125. For example, it would be useful to provide secure time stamps for phone book applications and data, synchronization, mobile payment or ticketing applications and related data, authentication and key management functions, or data related to mobile communication protocol stacks. Additionally, the expanded SIM ICC 105 may have many practical applications to DRM which are discussed later in this application.

Optionally, the WTRU 100 may include a second RTC 155 that is not on the expanded SIM ICC 105. The second RTC 155 will be connected to the platform processor 108 which may contain optional time report and sync control SW 157.

The combination of the second RTC 155 and the optional report and sync control SW 157 generates optional STC functionality on the WTRU 100. Further, the second RTC 155 on the platform may be used for applications that may not require the same level of high security as may be required for the first STC 130 that is more heavily protected inside the expanded SIM ICC 105. An example of such applications that require less security may be use for the tick counter for the OS or for casual calendar or stop-watch applications.

Optionally, the WTRU 100 may also include a second TPM unit 160 that is not on the expanded SIM ICC 105. This second TPM unit 160 will be connected to the expanded SIM ICC 105 in order to provide additional security functions. For example, since the SIM ICC 105 may be extracted, the TPM on each device (SIM ICC and platform) may act as the root of trust for that device. Therefore the second TPM 160 may use the slave TPM 150 in the SIM ICC 105 to verify its functionality and indeed perform a mutual authentication to bind the communications channel (interface) between the platform and the SIM ICC 105.

Figure 2:
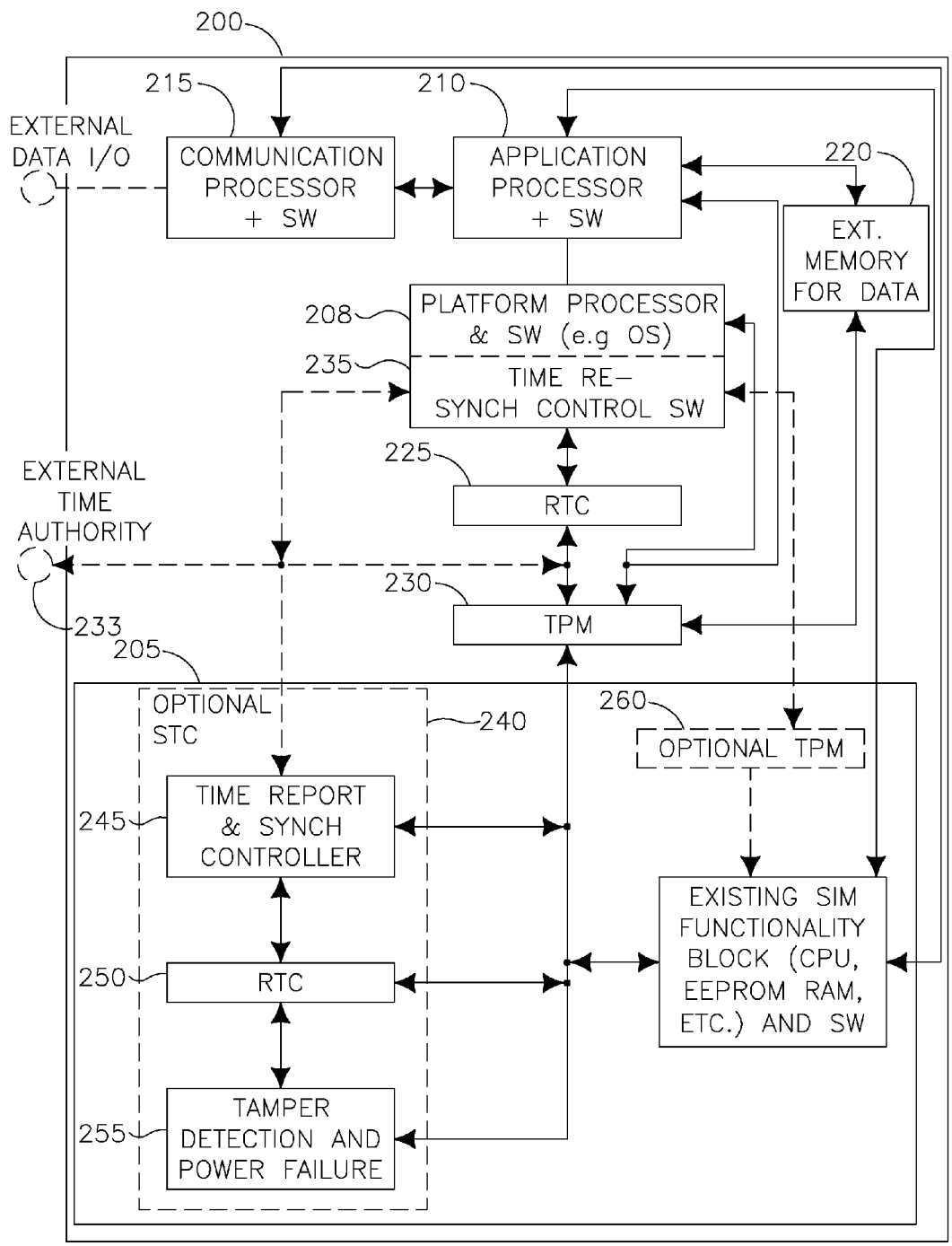
FIG. 2 is another diagram of an example WTRU configured to establish a trustworthy local time.

FIG. 2 is another example diagram of a WTRU 200 configured to establish a trustworthy local time. The WTRU 200 includes a generic SIM ICC 205, a platform processor 208, an application processor and SW 210, a communication processor 215, an external memory for data 220, an RTC 225, and a TPM 230. The application processor 210 may include a DRM agent (not shown).

The WTRU of FIG. 1 is distinguished from the WTRU of FIG. 2 as the RTC 225, and the TPM 230 are located on the WTRU platform, and not on the SIM ICC 205. The RTC 225 may be linked to an external time authority 233 and the platform processor 208. The platform processor 208 includes time report and sync control software 235 for controlling the RTC 225. Therefore the platform processor 208 and the RTC 225 combine to serve as an STC for the WTRU 200.

By placing the RTC and the TPM on the WTRU platform rather than on the SIM ICC 205, the WTRU 200 will be compatible with generic SIM ICCs. This embodiment still provides secure time component features as described in the description of the expanded SIM ICC 105 of FIG. 1. For example, the TPM 230 on the WTRU platform may perform procedures to protect and enhance the security of the RTC 225, the time-reporting and re-synching application, and the time-record outputs produced. In an alternative embodiment, the WTRU 200 may be configured to operate without the SIM ICC 105. An example of such an embodiment would be a WTRU for a non-3GPP mobile phone.

Optionally, the WTRU 200 may be configured for use with an expanded SIM ICC by including an optional STC 240 on the SIM ICC. This optional STC 240 on the SIM ICC 205 may include a time report and re-sync controller 245, an RTC 250, and a tamper detection and power failure unit 255. Including the STC 240 on the SIM ICC 205, will provide a more secure source of time for SIM ICC applications.

Optionally, the WTRU 200 may be configured for use with an expanded SIM ICC 205 by including an optional TPM 260 on the SIM ICC 205. The optional TPM 260 may provide additional trust and security for SIM ICC applications as well as additional protection for data stored on the SIM ICC 205.

One of skill in the art would recognize that several other combinations and configurations are also possible, and may provide additional advantages. For example, SIM ICC may also be configured with an STC, without a TPM or the tamper detection unit. Any other embodiment that incorporated an STC onto a SIM ICC would also be considered within the scope of the invention.

In another embodiment (not pictured) the WTRU 100 of FIG. 1 and the WTRU 200 of FIG. 2 may be combined so that an STC is located on the SIM ICC and the TPM is located on the WTRU platform. The TPM on the WTRU platform may be used to protect and enhance the security of the STC inside the SIM ICC and any data that is produced by the STC.

In yet another embodiment (not pictured) the WTRU 100 of FIG. 1 and the WTRU 200 of FIG. 2 may be combined so that STC is located on the WTRU platform, and the TPM is located on the SIM ICC. In both of these additional embodiments, the WTRU will be configured to perform the same secure applications and operations described in the descriptions of FIGS. 1 and 2. It should be noted that having an STC on the SIM ICC may afford a higher level of security in terms of physical attack on the RTC itself. In addition, without a TPM on the SIM, it is not possible to secure a channel between the SIM and the platform, nor is it possible to perform mutual authentication between the platform and the SIM ICC, unless the SIM functionality is expanded to provide for either a shared key or a public/private key pair or the network which shares the secret in the SIM ICC to assist setup of the secure channel.

The TCG-specification describes one basic process for binding the internal TPM Tick Counter Value to an external trusted time source, i.e., a real time clock source. This is described in more detail below. The TCG specifications do not contain any concepts beyond this basic mechanism.

It may be shown that seldom connected, loosely coupled devices use these facilities to collect enough data to provide trusted time statements (TTSs) to third parties. Binding the external time may occur even long after the time stamps are produced. In particular, it is possible to do this in a way that most of the devices never need to know the actual time. The common idea behind the methods is cooperation between the TPM's internal tick counter on a platform or in a device with other entities to obtain relations between tick counter values and real time clock values. Such statements are embodied by appropriately using signed tick counter values (tick stamps) and time stamps in conjunction.

The typical accuracy statement (AS), i.e., the TPM AS, is not fully satisfactory from a trust and security viewpoint. A verifier must have trust in the proper functioning of the TPM tick counter between periods $T\_1$ and $t\_a$, respectively, and $t\_a$ and $T\_2$, with respect to accuracy, to assess and trust the assertion made by an AS regarding the real time distance between them. One method to enhance the binding of a $T(TCV(t))$ to a real time clock value is to frame it in between two time stamps. For this example, as an alternative to the accuracy statement described above, time stamps from the TA may be folded around a TS(TCV) of P, leading to a semantically different TTS.

Figure 3:
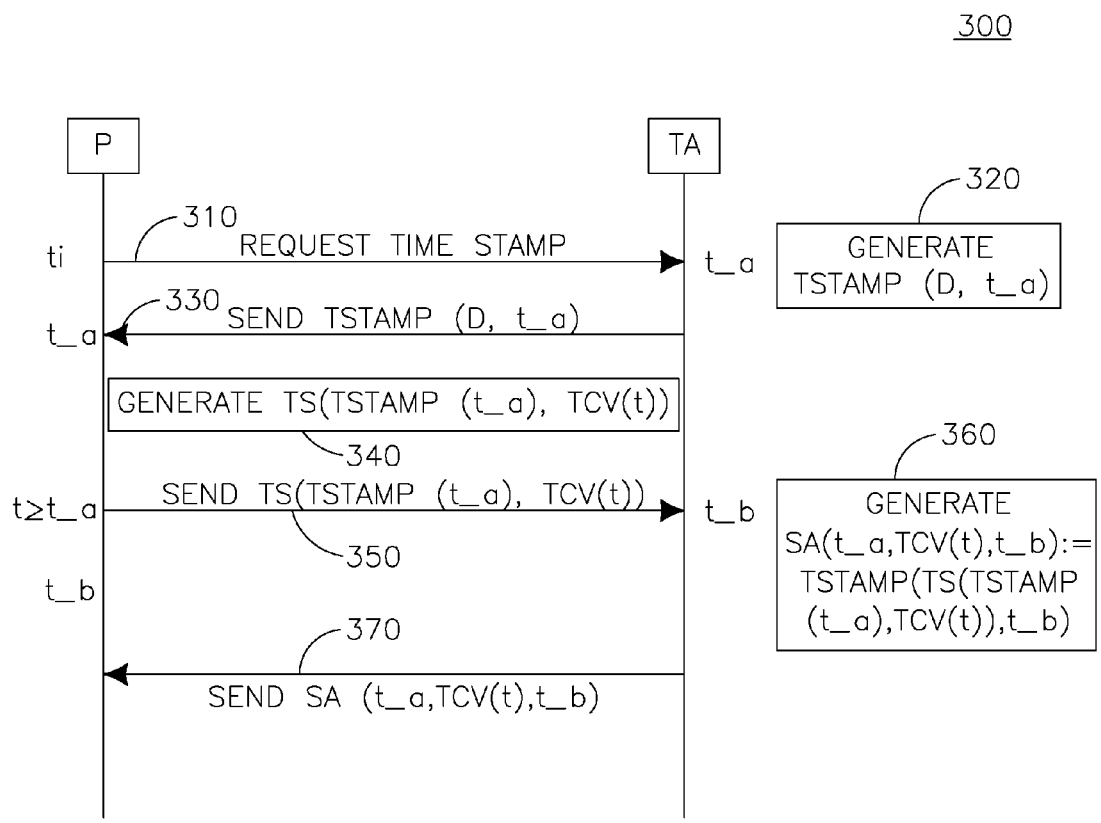
FIG. 3 is a flow diagram of an example method demonstrating alternate accuracy statement generation.

FIG. 3 is an example flow diagram demonstrating alternate accuracy statement generation 300. At some initial time, the platform P requests a time stamp 310 over some arbitrary, known data D from TA. At $t\_a$ the TA generates TStamp(D, $t\_a$) 320, and sends it immediately back to P 330. P receives the time stamp from TA at time $t \geq t\_a$, and generates TS(TStamp($t\_a$),TCV(t)) 340 and sends it immediately back to TA 350. TA receives the structure TS(TStamp($t\_a$),TCV(t)) and generates at $t\_bSA(t\_a,TCV(t),t\_b):=TStamp(TS(TStamp(t\_a),TCV(t)),t\_b)$ 360, and immediately sends this structure back to P 370.

This alternative accuracy statement SA($t\_a$, TCV(t), $t\_b$) is a trusted time statement asserting the relation:

$$t\_a \leq T \leq t\_b, \text{ where } T := T(TCV(t)) \qquad \text{Equation 4}$$

Such an alternative accuracy statement may be used by the external TA to attest to an estimated range of true time when a TPM tick-stamping occurred.

Figure 4:
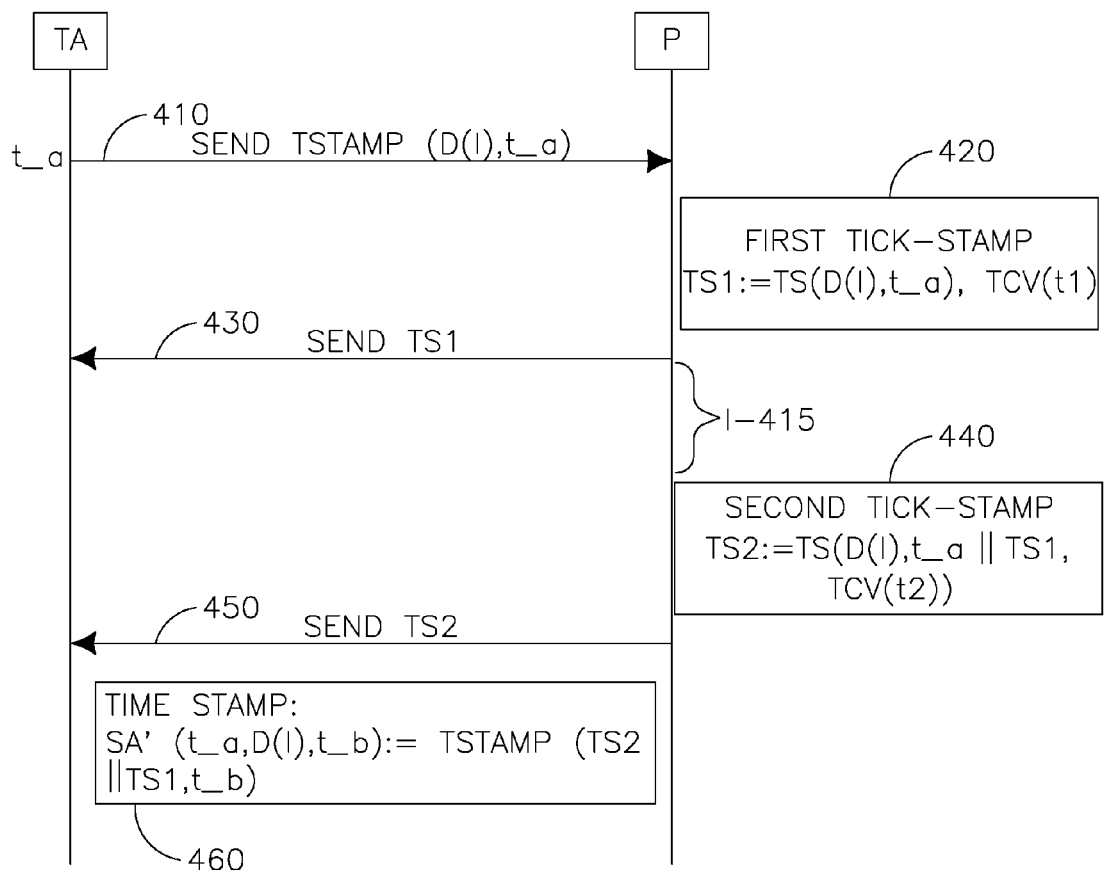
FIG. 4 is another flow diagram of an example method demonstrating alternate accuracy statement generation.

FIG. 4 shows another variation for alternative accuracy statement generation 400. At some initial time t_a, the TA issues a time stamp of a data D(I) that contains instructions to P to issue two successive tick-stamps 410 over a predetermined interval I 415. Hence, TStamp(D(I), t_a) is obtained. After issuing the time-stamp, the TA sends this immediately to the platform P. Upon reception of TStamp(D(I), t_a), P generates the first tick-stamp TS1 by tick-stamping D(I)∥t_a 420. Hence, P obtains:

$$TS1:=TS(D(I), t\_a), TCV(t1)) \qquad \text{Equation 5}$$

In this example, note that t1 is the actual time when the tick stamping takes place. P sends this immediately to the TA 430. P waits for an interval I 415, and then generates a second tick stamp 440, i.e, $$TS2:=TS(D(I), t\_a\|TS1, TCV(t2)) \qquad \text{Equation 6}$$

where t2 is the local estimate (at P) of t=t1+I. Again, the P sends this tick-stamp immediately to the TA 450. Upon receiving both tick stamps TS1 and TS2, TA time-stamps 460 the following:

$$SA'(t\_a, D(I),t\_b):=T\text{Stamp}(TS2\|TS1, t\_b) \qquad \text{Equation 7}$$

This alternative accuracy statement SA' is a trusted time statement asserting the relation:

$$t\_a<=t1<t1+I<=t\_b \qquad \text{Equation 8}$$

where t1:=T(TCV(t1)), and t2:=T(TCV(t1+I)).

Such a statement SA' may be used to estimate the TIR of the TPM.

There are noteworthy variations in the implementation of a compound system for the generation of SA(t_a,t_b), or SA'. First and foremost, the two time authorities need not be identical. P may obtain the first time stamp from TA and the second from another time authority TA'.

Figure 5:
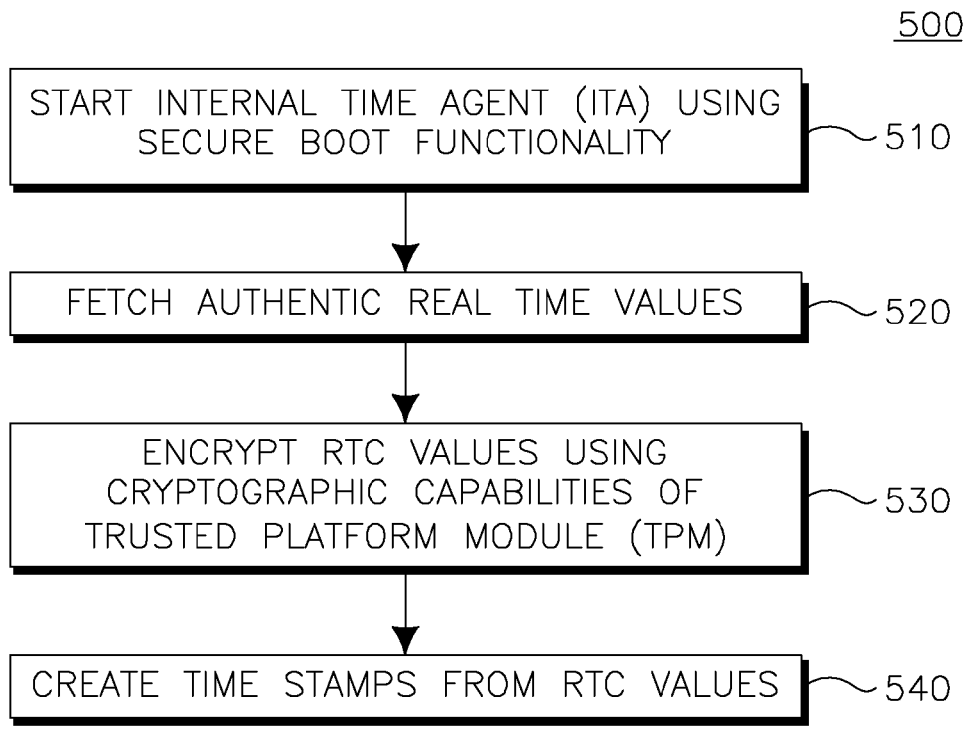
FIG. 5 is a flow diagram of an example method demonstrating a variation of an alternate accuracy generation.

FIG. 5 is an example flow diagram showing a second main variation when either TA and/or TA' is an internal entity of the platform, i.e., a Real-Time Clock (RTC) combined with time-stamping functionality 500. This may be realized in an elegant way using the Trusted Computing capabilities of the platform as follows. At the beginning of each boot cycle, the trusted platform P initiates a particular program, the Internal Time Agent (ITA) 510. The platform enforces that the ITA is initiated and properly configured in a trustworthy, uncompromised state using the Secure Boot functionality of the TCG Mobile Phone Working Group's specification. Alternatively, if the platform only supports a measurement of loaded programs at boot time, the presence and trustworthiness of the ITA may at least be attested to external verifiers via remote attestation. Many ITA instances for dedicated purposes may coexist on P.

The ITA may take the place of a TA in the generation of accuracy statements as follows. There is a secure channel between the ITA and RTC through which the ITA may fetch authentic real time values at any time 520. The ITA may protect the RTC values using the cryptographic capabilities of the TPM 530, e.g., by using the TPM_Seal and TPM_UnSeal commands to encrypt them. The ITA generates time stamps from these RTC values using either a software cryptographic library or the signing capabilities of the TPM 540, e.g. the TPM_sign command. The signing keys used by the ITA may, for example, be unique keys associated with the particular ITA instance. Another option is that ITA uses Certified Signing Keys (CSKs) bound to an Attestation Identity Key (AIK) of P, which means that the certificate certifying the CSK is signed by the AIK. This may be done in direct analogy to the method described below. It has the advantage of attesting to the ITA's presence within a particular trusted platform P, whose state in the presence and uncompromised functionality of the ITA may be verified by an external entity via the TC capability of Remote Attestation.

A tighter binding of the RTC and the TCVs may be desirable in some cases, extending the TCG specifications in that vein. Assume RTC and ITA have a comparable, or even higher, security level than the TPM's internal tick counter (for instance, both are implemented in specially protected hardware). Then, the RTC may be used as an internal time authority as above, but also to actively influence the tick counter. For example, the RTC and tick counter may be driven by the same clock source. The RTC may also, via the ITA or directly, reset the tick counter, or provide correction values, when it detects drift. This potentially increases the trustworthiness of the accuracy of the TPM_TickStampBlob outputs. The trust on the ITA (that uses the RTC's output and the TPM Tick Stamping to assert time values) may be improved by the fact that if one protects the RTC (or its outputs), then the tick-stamping from a TPM that uses the more trustworthy RTC (or its output) is also made more trustworthy.

Note also that additional information from the RTC may be incorporated into unused spaces in the TPM_SIGN_INFO data structure. Alternatively, an enhanced TPM_SIGN_INFO data structure could be specified to provide an absolute indication of date and time rather than just the TCG mandated session values (TCV and TSN).

The TA may be configured to compensate for signature delay, since the TA is, in most cases, better equipped to make time statements of high accuracy than P. A simple model for TA assumes that both the time d_t required to fetch the UTC time from its time source, and the time D_t required to generate a time stamp, are known with high accuracy, e.g., by continual measurement or as defined functional parameters. As for the time-related TPM-operations on P, we assume d_t=0 also for TA. A generalization of the following method to d_t>0 is straightforward. In what follows, we describe a signature delay compensated accuracy statement, denoted by SA(t,t').

To compensate for D_t in the generation of a signature delay compensated accuracy statement, denoted by SA(t_a, t_b), the method shown in FIG. 3 may be modified such that the TA includes D_t in the first time stamp 320. In one alternative, referred to as (D_t, variant a), the TA generates, at time t=t_a, a time-stamp TS(D', t_a) for a signature-delay-compensated data package denoted by D' where D'=D_t, or D'=D∥D_t, and includes it in the trusted time statement SA(t_a,D',t_b). Here, D_t denotes a tightly-known (or estimated) time duration for the TA to generate a time-stamp for the data. Thus, if D'=D_t, the TA is merely time-stamping the delay it requires to generate a time-stamp, and if D'=D∥D_t, then the TA is time-stamping not just the delay, but also the data D itself that it time-stamped initially 320. In a second alternative, referred to as (D_t, variant b), the TA adds D_t to t_a and generates at time t_a, a time-stamp TS(D, t_a+D_t), and includes it in a trusted time statement SA(t_a+D_t,D,t_b) and sends it immediately back to P. The resulting trusted time statement, SA(t_a, D'=D_t, t_b) (from variant a), or SA(t_a+D_t, D, t_b) (from variant b) is then:

$$t\_a+D\_t \leq T \leq t\_b, \text{ where } T:=T(TCV(t)) \qquad \text{Equation 9}$$

which yields a tighter time bound than in the case when one uses just SA(t_a, D, t_b), since with SA(t_a, D, t_b), only t_a≤T≤t_b, where T:=T(TCV(t)) is obtained.

Note that this method, if applied to the TCG-defined accuracy statements AS instead of SA, obtains a trustworthy tighter time bound only if it can verify the accuracy of the tick values, which is normally not possibly. Namely, using the TCG-defined accuracy statements AS would just shift the RTC value signified by the time stamp in the middle between two tick values, without adding any assertion about the outer TCVs. This highlights again the shortcomings of the TCG accuracy statement AS.

The tick increment rate is a factory parameter of the TPM in the platform. Even if its initial value is trustworthy and precise enough for practical purposes, this may change over time since such hardware properties that determine the actual TIR of the particular TPM may change over long time spans. Here, a method to measure the actual TIR of the TPM in P with arbitrary accuracy is presented.

Figure 6:
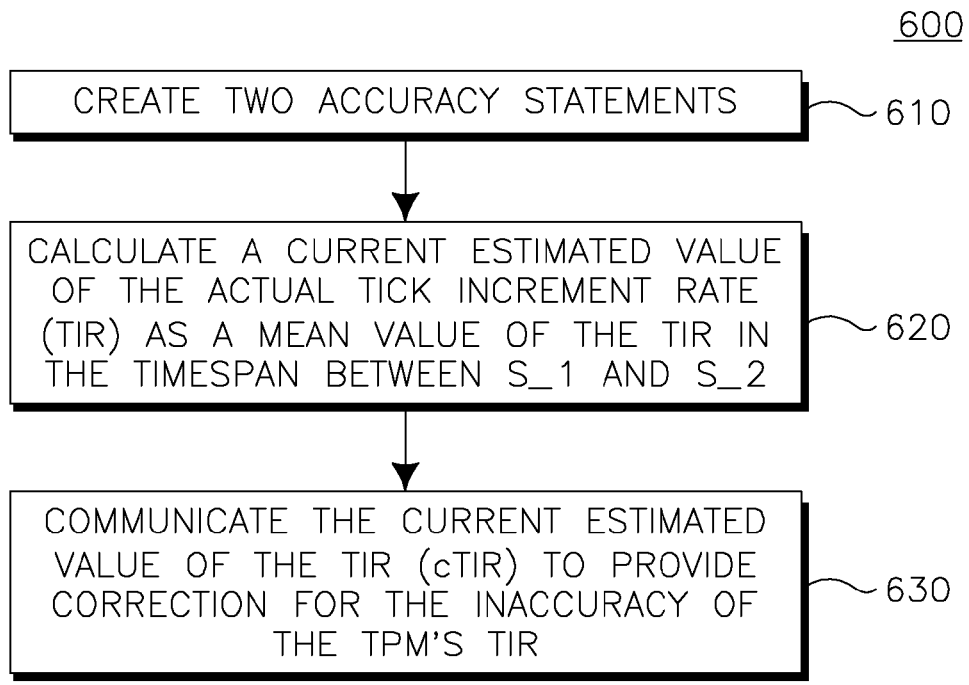
FIG. 6 is a diagram of an example method demonstrating trustworthy TIR measurement.

FIG. 6 is an example diagram demonstrating trustworthy TIR measurement 600. P generates two accuracy statements $S\_1:=SA(t\_a,TCV(t\_1),t\_b)$, and $S\_2:=SA(t\_c,TCV(t\_2),t\_d)$ 610. From this, an external verifier to whom P delivers $S\_1$ and $S\_2$ calculates a current estimated value of the actual TIR as the mean value of the TIR in the time span enclosed by $S\_1$ and $S\_2$ 620 as follows:

$$t'\_1:=(t\_b-t\_a)/2, \text{ and } t'\_2:=(t\_d-t\_c)/2 \quad \text{Equation 10}$$

$$cTIR(S\_1,S\_2):=(t'\_2-t'\_1)/(TCV(t\_2)-TCV(t\_1)) \quad \text{Equation 11}$$

As the accuracy statements involved yield bounds on the time intervals of constant TCV around $t\_1$, respectively, $t\_2$, cTIR obeys upper and lower bounds as well. These bounds are:

$$(t\_c-t\_b)/(TCV(t\_2)-TCV(t\_1)) \leq cTIR \leq (t\_d-t\_a)/(TCV(t\_2)-TCV(t\_1)). \quad \text{Equation 12}$$

Using two accuracy statements of type SA to measure TIR entails that this method concurrently provides upper and lower bounds on cTIR. This may be used in many business scenarios where opposing interests need to be balanced. For instance in DRM scenarios, the rights holder has an interest to limit the allowed consumption period of a piece of media, while the consumer has an interest in extending this period. The accuracy increases with the difference of the first and second tick counter value involved. Both cTIR and the bounds may be calculated by anyone in possession of $S\_1$ and $S\_2$. This may be an external verifier or the ITA in P. In this example, the latter then communicates the cTIR to external entities to provide correction for the inaccuracy of the TPM's TIR 630. Again, each of the time authorities in the TIR measurement may be chosen independently. In particular some of them may be related to an internal RTC value. To further increase accuracy of the estimate of the cTIR, the method described above for delay compensation may be used.

Note that the accuracy of the bounds may be continuously improved by using more and more time assertions since then the sample space not only of ticks but also of accuracy statement generation (in which times for communication round-trips and signature generation may vary) gets larger and thus statistical errors smaller. Estimates of the drift rates of the TIRs may be obtained using time assertions spread over sufficiently long time intervals. The drift rate may also be expressed as the first derivative of the TIR.

The ageing of timing devices or technology on a device may be evidenced by a slowly growing drift of the real TIR from the factory value and deviations from that ageing behavior may yield valuable information. Thus, cTIRs and the measurements involving accuracy statements leading to them may be used in various circumstances to derive assessments about P's state, functional parameters, or trustworthiness. Instances of particular importance are discussed below.

In tampering detection, active side-channel attacks on the device or its TPM or MTM may cause deviations of cTIRs, as many of these attacks operate on the timing of a device's internal processes. A way to detect this is to look at the statistical variance of measured cTIRs. If it is greater than a certain preset value (which may be determined experimentally on correctly functioning device samples), it may be interpreted as an attack on the device (platform P), the TPM, or the tick counter.

In malfunction detection, cTIRs may be consistently and significantly lower or higher over a period of time and higher than normal deviations caused by ageing would result. This situation may be interpreted by an outside observer as evidence of malfunction of the device tick counter or the device itself.

Detection of abnormal operating conditions: If cTIRs are randomly and significantly lower or higher over a period of time and more than normal deviations caused by ageing, voltage variations, or temperature variations etc., would allow, this may also be interpreted by an outside observer as evidence of abnormal operating conditions or tampering of the tick counter or device.

The detection methods described above may be embedded in trusted devices deployed in the field in large quantities, where such devices may not have other capabilities (such as enhanced sensors) to detect an anomaly other than the methods described above. A prospective field of application may be to embed TPMs in machine-to-machine (M2M) systems that are deployed, unattended or un-serviced by humans for extended periods of time.

Figure 7:
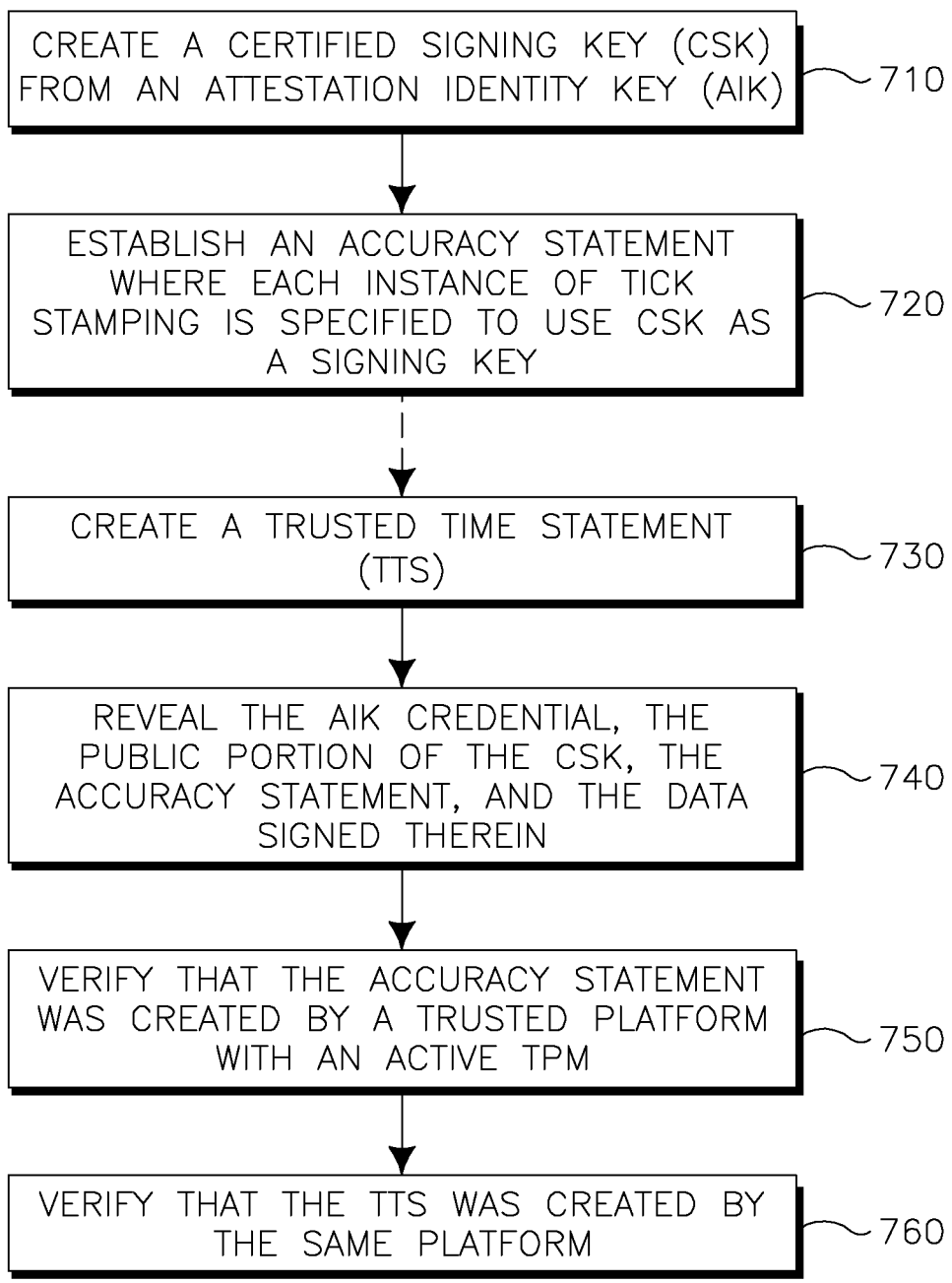
FIG. 7 is a diagram of an example method demonstrating a method to protect accuracy statements.

The trusted time statements described so far make no assertion by themselves about the trustworthiness and/or identity of P. The latter obviously depends on the signing keys used by P to sign the tick stamps. This is security critical for accuracy statements as well as for tick stamps at later times, which rely on them. Namely, the TA does not per se know the state of the platform requesting the statement; worse, it does not even know that it communicates with a TPM at all, since the tick stamp operation as well as the tick counter itself may be emulated. Thus, without further protections, accuracy statements are open to all kinds of attacks, including TCV manipulation, forging of tick stamps, man-in-the-middle attacks, etc. FIG. 7 shows an example method that may overcome some of these problems.

FIG. 7 is an example diagram demonstrating a method to protect accuracy statements 700. Assume P has generated an Attestation Identity Key (AIK) and possesses an AIK credential for it from a Privacy CA (PCA), which it has requested according to the protocols defined by the TCG. An accuracy statement is bound to the platform identity in the following way. P may generate a Certified Signing Key CSK from the AIK 710. P and TA may then generate an accuracy statement AS( ) and SAO( ), respectively, where each instance of tick stamping by P is specified to use CSK as signing key, i.e., TS[CSK](TCV(t*)) at each time t* a tick stamp is invoked in either protocol 720.

The CSK used above may be dedicated for this single operation and be discarded after generating the accuracy statement, or it may be used in further operations, in particular for tick stamping at later times. To prove possession of a data blob D by the trusted platform P to a verifier V at a later time t, P may generate TTS(t):=TS[CSK](D,TCV(t)), where CSK is either a new key certified by AIK or the original one used in the accuracy statement generation 730. P may reveal to V the AIK credential, the public portion of CSK, the accuracy statement or the data signed therein, TTS(t), D, and TCV(t) 740. V may then verify that the accuracy statement was generated by a trusted platform with an active TPM which satisfies the security requirements specified by the TCG in general 750 and in particular with respect to timing ticks or that the trusted time statement TTS(t) was generated by the same platform 760.

Similarly, not only accuracy statements, but any other trusted time statement may use CSKs. In particular, every tick stamp operation by the TPM may use a CSK to generate a TTS signifying the possession of some data at a certain TCV.

The PCA may play the role of a TA to provide an accuracy statement by integrating the processes of AIK certification and TTS generation. This process of certifying an AIK between platform P and PCA is augmented as follows.

When P requests certification of AIK from PCA, it also issues a request for an accuracy statement SA according to the methods described above. PCA and P run the protocol above for generation of SA, wherein the signed data D is specified as the public portion of the AIK for which certification is requested, or concatenated to it. Note that in this protocol the tick stamp of P cannot be signed by a CSK for the AIK in question, since the latter is only activated for use after certification by the PCA. Thus another signing key must be used by P for the tick stamp and it is the responsibility of PCA and P to mitigate man-in-the-middle attacks of the SA generation protocol. This is ensured by usage of encryption and nonces during the AIK certification process. Only after using encryption and nonces will the PCA proceed with AIK certification.

This TTS alone has the significance of a receipt of an AIK certification request. The significance of the TTS generated and the AIK certificate, when presented together to a verifier is that P is a trusted platform which requested AIK certification at a certain time and the time of the AIK certification request lies within the two time values signified by the two TCVs in SA, i.e., the same verifiable statements as for the TTS generated above.

The TTS is bound to a specific AIK of P by a reference point. Thus, every later tick stamp issued at a later time by P, or another accuracy statement generated by P, may be bound to the reference point in time and its trusted relation to a TCV using CSKs for the AIK as described above. One use case for this kind of assertions is the revocation, respectively, invalidation of AIK credentials of rogue platforms.

The problem of the need for an additional signing key noted above may be circumvented when the generation of the TTS is deferred until AIK certification by the PCA has taken place in the following way. When P requests certification of AIK from PCA, it also issues a request for an accuracy statement SA according to the methods described above. PCA executes AIK certification and generates the certificate. PCA generates the first time stamp of the SA generation protocol, including the AIK's public part or the whole AIK certificate as signed data. PCA sends AIK certificate and the first time stamp to P, and optionally starts a timer. P and PCA complete the SA generation process, wherein P uses a CSK for the AIK. Optionally, the PCA may enforce freshness of the TTS generated by issuing the last time stamp only if the timer value is not larger than a certain prescribed value, so that the TCV signified in it lies only a limited time after the AIK certification.

The TCG has introduced the concept of Remote Attestation to prove to a verifier that a platform not only contains an active TPM but also is in a precisely determined, trustworthy state. A major problem with this concept is that a platform's state usually changes over time.

Figure 8:
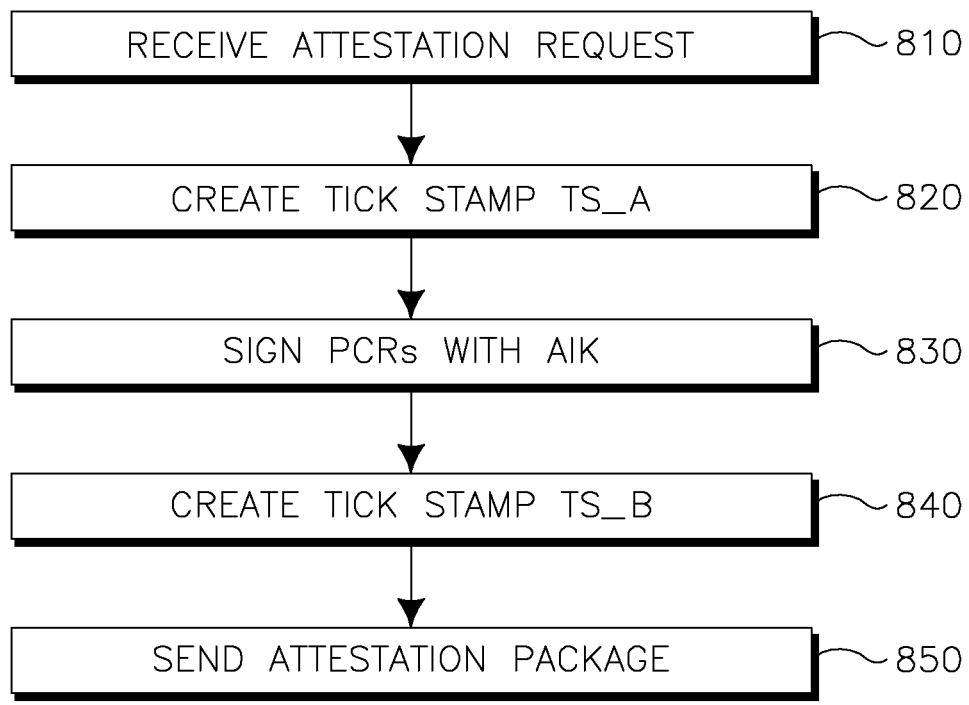
FIG. 8 is a flow diagram of an example remote attestation process.

The remote attestation process may be extended to contain statements about the time at which it happens. FIG. 8 is a flow diagram of an example remote attestation process 800. After reception of an attestation request 810 from a verifier, and establishment of an authorization session between attestation client and TPM, a tick stamp TS_A is generated 820. This may be performed using a CSK for the AIK used in the subsequent remote attestation. P then proceeds with remote attestation by signing platform configuration registers (PCRs) with the AIK 830 using the TPM_Quote command.

As a further extension, to measure the time distance between the state of P signified by the signed PCRs and the Stored Measurement Log (SML), a second tick stamp TS_B may be generated 840 immediately before sending the attestation package (AP) 850 to the verifier. The advantage of this method is that the SML in practice stores events with a certain granularity, i.e., not all informational, let alone physical, changes of the platform's state are recorded in the SML. The depth of the SML depends on the implementation of P and in particular the trusted operating system. Thus there may be events not stored in the SML which occur between signing of the PCR values and fetching the SML. The probability for this may be assessed using the time difference signified by the difference between TS_B and TS_A.

Various alternatives may be implemented, for instance the attestation client may request time stamps from a TA to generate accuracy statements by any of the methods described above, the attestation client may act as, or cooperate with, an internal ITA to generate accuracy statements in place of mere tick stamps based on RTC values, the tick stamps may be integrated in a modified attestation package data structure, or the stored measurement log (SML) of the platform may be extended by tick stamps.

The time statements incorporated in remote attestation by the method just described may be used to alleviate in part the burden of the verifier to keep a large database of trustworthy platform states. For instance, a PCA may maintain a list of rogue platforms (for instance using information that a certain malware has, at some time, affected platforms in a certain state) and the verifier may submit AP, TS_A, TS_B to PCA to obtain information (a 'second opinion') on the trustworthiness of P at attestation time.

The time statements are yet more useful, when they may be compared to attestations, via states of P, at earlier times. For this, subsequent attestations have to be carried out using the same identity, i.e., AIK (though this is somewhat contrary to the spirit behind the inception of AIKs which are thought to protect a platform's identity). Then a verifier may assess whether the platform state has changed in an undesired way in the meantime between attestations.

At each reset of the TPM counter a Nonce is required to obtain a well defined security context for communicating time statements to external entities. This Tick Session Nonce, TSN, is later used to associate the time stamp with this reset operation. The Nonce is required to be unique for this device and for each reset operation and therefore generated by the random number generator within the TPM. The actual TSN may be obtained by issuing the TPM_GetTicks command. The TSN value is included in the resulting CURRENT_TICKS data structure.

The current TCG specification makes no requirement on the capability for the TPM to maintain the ability to increment the tick counter across power cycles or in different power modes on a platform which results in a loss of the session. To establish a session which holds also for reboot cycles and different power modes a meta session concept is required providing a session which is able to span different TSN sessions using a meta TSN (mTSN).

Figure 9:
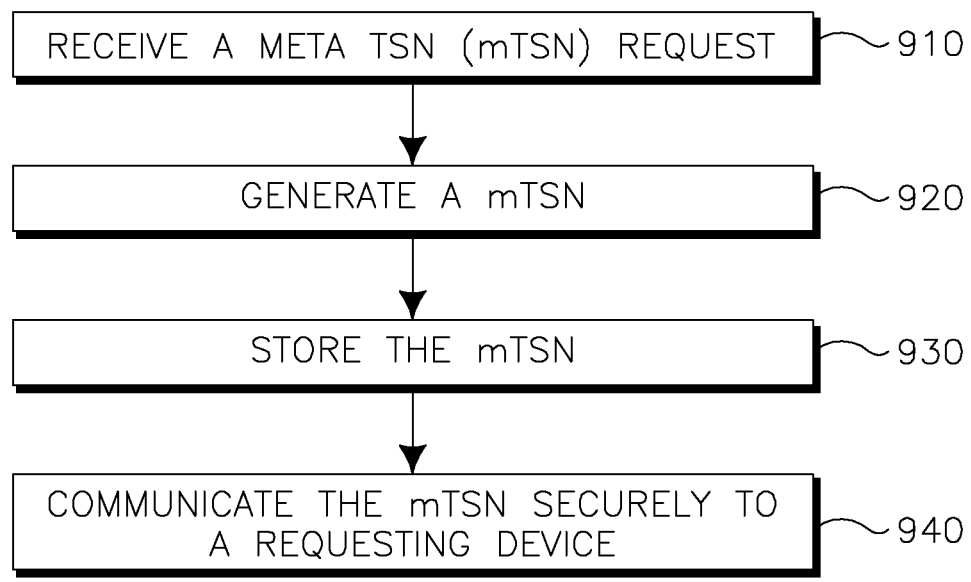
FIG. 9 is diagram of an example method demonstrating a meta session.

FIG. 9 is diagram of an example method demonstrating a meta session 900. A mTSN may be either generated by an external time provider or authority (TA), or internally by the TPM's random number generator. In the first case, the TA receives a mTSN request from the device at a certain point in time during an initialisation process of the platform 910, for example booting the operating system generates a mTSN 920, stores it 930 and communicates it securely (TPM-sealed) to the device 940. In the second case, the device generates a mTSN and binds it to a platform attestation and sends the bound mTSN toward the TA to assert that mTSN was generated by a live, unaltered TPM on an uncompromised platform. This mTSN is then used as a Nonce for the TPM_TickStampBlob command. Each issued stamp then includes the mTSN, assigning it to the specific meta session.

Note that in both cases, the device must send either the request for mTSN to the TA or send TA the mTSN it itself generated, at a time during the session initialization cycle.

The usage of mTSN is not protected by hardware means and requires a trustworthy operation environment which is defined in TC. This operation environment is verified by attestation operations, which allow the mTSN to be sealed to a certain well defined state of the overall system. Instead of using a static mTSN it is also sound using the last TSN as Nonce for the next stamp operations. This would result in a chain linking the sessions. To prove the integrity of this chain it is required to add offline attestation data at least to the first stamp. This allows for deferred verification of the system state.

The need for a nonce database at the time provider (TA) or the operator may be eliminated or mitigated by extensive use of signatures issued by TA and the operator. This scheme offers a big gain in flexibility as the communication with the network side is reduced to a minimal set of transactions. On the device side the Nonce is an equivalent to a cookie (session value) which allows for several different time services and possibly reference frames which may be used in communication.

Another approach to bridge the gap between the single sessions and to prove the monotony of the sessions is to include a Real Time Clock (RTC) in the platform design which may be considered trustworthy. This trusted RTC provides signed dates whose signatures are included according to the above presented mTSN scheme. This has to be done at least with the first Nonce. Implementing a trusted RTC requires establishing protected cryptographic functionalities and a unique identity.

In some use cases it is required to predict the TCV in the future by using the TCV reported at the last report and the TIR. In case that the original session terminates due to e.g. a power down it is necessary to span this event and to map the old TCV value to the subsequent session. This is done by using the AS of the original session together with the received date and time stamp binding the TCV to a certain point in time. Each subsequent session also receives an AS. By using the two AS, date and time information and the TIR, it is possible to calculate the elapsed time correlating the TCV of the event in the subsequent session. Moreover by analyzing the log of the system and the interaction profile it is possible to estimate the 'out-of-session' durations (e.g. power-failure durations). This basic scheme may also be combined with the concept of the mTSN concept presented earlier.

One application for Trusted Computing technology is for use in DRM. Accuracy statements may be used at two stages in a DRM scenario. The following examples use the nomenclature of the Open Mobile Alliance. The general scenario assumes that a device is equipped with a DRM agent, i.e., an entity exerting access control over content in compliance with rights set by a certain rights holder.

Figure 10:
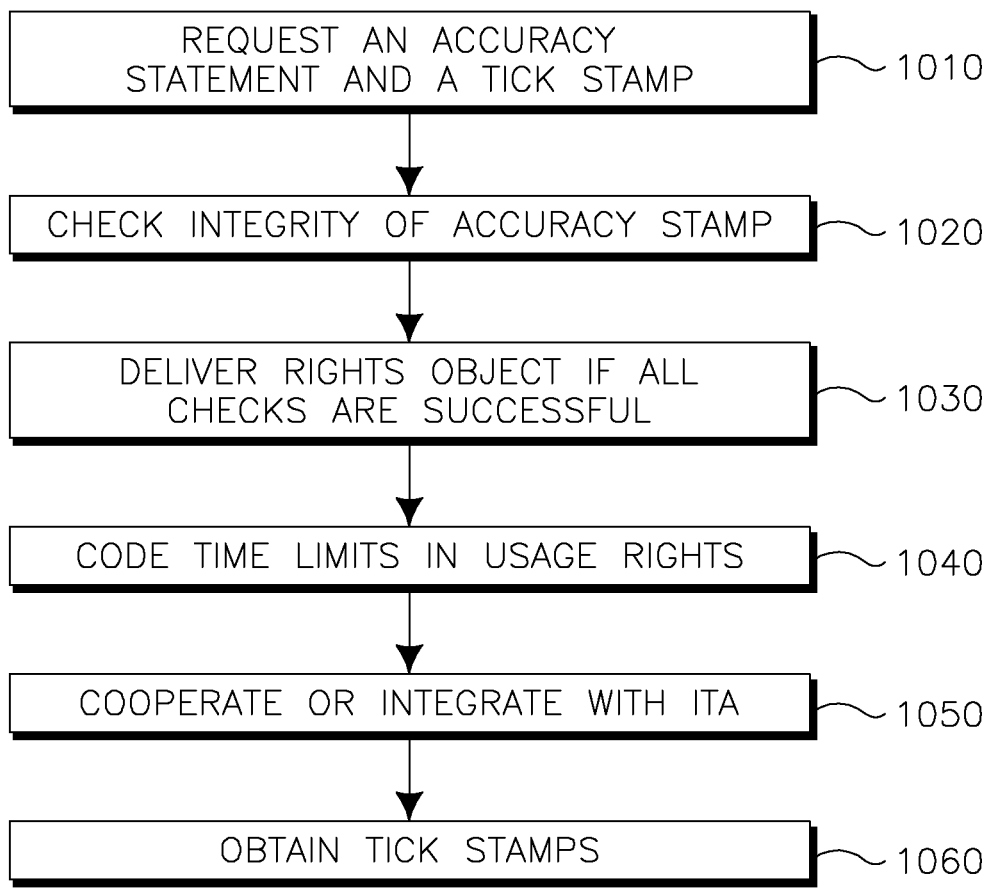
FIG. 10 is a flow diagram of and example method for using Trusted Computing technology in DRM.

FIG. 10 is a flow diagram of and example method 1000 for using Trusted Computing technology in DRM. In this example, the Rights Issuer (RI) may request an AS, and a tick stamp 1010, from the DRM Device during the execution of the Rights Object Acquisition Protocol (ROAP), as defined in the OMA DRM v2.0 standards. The AS may be bound to an attestation statement on the platform to allow the RI to check its integrity 1020. In this way, the RI obtains assurance that the DRM agent is active and uncompromised, and has access to an accurate, un-tampered time. The rights object (RO) is then only delivered 1030 if all these checks are successful. The RI may then code time limits 1040 in usage rights directly in terms of TSN and TCVs in the RO. Upon receiving the RO in this initialization phase for rights acquisition, the DRM agent may cooperate 1050 with an ITA on the device, or even be integrated with it. The DRM agent may then obtain tick stamps 1060 from the TPM and compare the TSN and TCVs to the limits expressed in the RO and exert access control to the content accordingly.

In a second example, the time limits in the ROs use the standard time format, e.g., UTC, values, and it is the task of the DRM agent to associate them to TCVs. The DRM agent may use an AS generated at boot time to ensure that TCVs are bound to an accurate external time, and belong to the same session of the Tick Counter (by comparison of TSNs in the AS and the MTM Non Volatile Memory). Again, the DRM agent has a valid time-to-TCV association to base access control to content on. When the time span between the AS and the time at which content is accessed is long, the TCV might incur significant drift, and the method above may be used to correct this.

In DRM scenarios, the limitation of validity of TCVs to a single tick session expressed by a unique TSN may be useful. The rights may be bound to a specific TSN value and the DRM agent will not grant access to the protected content when the tick counter is reset and the TSN updated. If some entity, for instance MTM, DRM agent or ITA, is able to reset the tick counter (either by any means that disable the tick counter and enforce a reset as mandated by the specification or by extension of the functionality specified in the TCG standard), this may be used to invalidate access rights to content at any TSN session, desired time or TCV. If, on the other hand, maintenance of access rights beyond a single TSN session is desired, methods may be used by the RI, DRM agent and/or ITA to bridge sessions and update the TCV and TSN limitation of validity.

There are many instances when a trusted mobile phone will receive an external RIM certificate from an external entity and convert it to an Internal RIM certificate which it will then hold and use for internal platform attestation purposes. The external certificates, in many cases, will have validity information in terms of date and time. The current TCG Mobile Phone Working Group (MPWG) specification however does not include explicit fields for date and time. The background of this decision by the MPWG was that neither the TPM nor the platform were anticipated to have an ability to have trusted time information at hand for validity checks of the certificates. The internal RIM_Certificate for the Mobile Phones currently uses only the monotonic counters for validity check purposes. This obviously limits the type of validity checks that may be made on the RIM_Certificates.

However, if there is a secure time source, for example provided by the methods described in earlier sections of this document, the validity of the RIM certificate may be checked against validity periods represented in terms of real date and time.

In an alternative embodiment, the internal reference integrity metric (RIM) certificates of a trusted mobile phone may be made more secure in a system which includes a secure and trusted internal time agent (ITA). The ITA securely handles the real time information provided by a secure RTC. For phones with such capabilities, the monotonic counter field in the internal RIM_Certificate structure may be replaced or supplemented with a date and time field provided by the ITA. Likewise, if session bridging of TSN and/or TCV values is available from the ITA and the phone's TPM, one could also include a chained record of the session values of the TSN and/or TCVs in an appropriate place on the internal RIM Certificate. Using hash extensions may be an option to capture the history of session values of TSN and/or TCV in a way that may be verified by an verifier.

In terms of the possible fields to include such supplemental information as the date/time or the session-bridged information on TSN/TCV, the extensionDigest field (64 bytes) available in the current RIM_Certificate format may be used. Note that this field is meant for the Digest of a proprietary or auxiliary data field and may thus provide a place for insertion of this date and time data.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for protecting time values in wireless communications comprising:

transmitting a first time stamp comprising instructions to successively transmit a first tick stamp and a second tick stamp;

receiving the first tick stamp;

receiving the second tick stamp generated upon the expiration of a predetermined amount of time following the generation of the first tick stamp;

determining the predetermined amount of time based on the first tick stamp and the second tick stamp; and modifying the first time stamp to generate a second time stamp comprising an indication of the first tick stamp, an indication of the second tick stamp, and an indication of the predetermined amount of time.

2. The method of claim 1, wherein the instructions comprise the predetermined amount of time.

3. The method of claim 1, wherein the first time stamp comprises data.

4. The method of claim 1, further comprising obtaining the first time stamp from a first time authority.

5. The method of claim 4, wherein modifying the first time stamp to generate a second time stamp is performed by a second time authority.

6. The method of claim 5, wherein at least one of the first time authority and the second time authority is an internal time agent.

7. The method of claim 1, further comprising:
fetching a real time clock value;
protecting the real time clock value; and
generating the first time stamp from the real time clock value.

8. A wireless transmit/receive unit (WTRU) comprising:
a Trusted Platform Module (TPM) configured to
transmit a first time stamp comprising instructions to successively transmit a first tick stamp and a second tick stamp,
receive the first tick stamp,
receive the second tick stamp generated upon the expiration of a predetermined amount of time following the generation of the first tick stamp,
determine the predetermined amount of time based on the first tick stamp and the second tick stamp, and
modify the first time stamp to generate a second time stamp comprising an indication of the first tick stamp, an indication of the second tick stamp, and an indication of the predetermined amount of time.

9. The WTRU of claim 8, wherein the instructions comprise the predetermined amount of time.

10. The WTRU of claim 8, wherein the first time stamp comprises data.

11. The WTRU of claim 8, wherein the TPM is further configured to obtain the first time stamp from a first time authority.

12. The WTRU of claim 8, wherein the TPM comprises an internal time agent.

13. The WTRU of claim 12, wherein the internal time agent modifies the first time stamp to generate the second time stamp.

14. The WTRU of claim 12, wherein the internal time agent is configured to:
fetch a real time clock value,
protect the real time clock value; and
generate the first time stamp based on the real time clock value.

* * * * *